United States Patent
Feistel et al.

(10) Patent No.: US 6,924,317 B2
(45) Date of Patent: Aug. 2, 2005

(54) PROCESS FOR PRODUCING COARSE-PARTICLE ANION-EXCHANGER GELS

(75) Inventors: Lothar Feistel, Delitzsch (DE); Gerold Schade, Dessau (DE); Hubertus Mittag, Wolfen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 62 days.

(21) Appl. No.: 10/404,469

(22) Filed: Apr. 1, 2003

(65) Prior Publication Data

US 2003/0191201 A1 Oct. 9, 2003

(30) Foreign Application Priority Data

Apr. 4, 2002  (DE) ......................................... 102 14 844

(51) Int. Cl.$^7$ ................................................. C08J 5/20
(52) U.S. Cl. ............................ 521/25; 521/31; 521/33; 526/78; 526/80; 526/87; 526/336; 526/218.1; 526/227; 526/342; 526/347; 526/909
(58) Field of Search ............................ 521/25, 31, 33; 526/87, 78, 80, 336, 227, 342, 347, 218.1

(56) References Cited

U.S. PATENT DOCUMENTS

| | | | |
|---|---|---|---|
| 2,992,544 A | 7/1961 | McMaster et al. ........... | 260/2.1 |
| 3,122,514 A | 2/1964 | Abrams ....................... | 260/2.1 |
| 3,847,840 A | 11/1974 | Kanig ......................... | 260/2.1 |
| 3,876,565 A | 4/1975 | Takashima et al. .......... | 206/2.1 |
| 3,965,039 A | 6/1976 | Chaplits et al. ............. | 252/426 |
| 5,157,084 A | 10/1992 | Lee et al. .................... | 525/301 |
| 5,834,524 A * | 11/1998 | Bloodworth et al. ......... | 521/30 |
| 6,228,925 B1 | 5/2001 | Pedersen et al. ............. | 524/458 |
| 6,356,683 B1 * | 3/2002 | Hu et al. ....................... | 385/37 |
| 2001/0002656 A1 * | 6/2001 | Schnegg et al. ............. | 210/656 |
| 2001/0009928 A1 * | 7/2001 | Podszun et al. .............. | 521/25 |

FOREIGN PATENT DOCUMENTS

| | | |
|---|---|---|
| DE | 1 285 170 | 4/1969 |
| DE | 158905 | 2/1983 |
| DE | 158906 | 2/1983 |
| DE | 229696 A1 | 11/1985 |
| EP | 062 088 A1 | 10/1982 |
| EP | 0 321 096 | 11/1988 |
| EP | 098 130 B1 | 11/1989 |
| EP | 101 943 B1 | 8/1990 |
| JP | 1 000 660 A1 * | 11/1999 |
| JP | 2000-140653 * | 5/2000 |

* cited by examiner

*Primary Examiner*—Tatyana Zalukaeva
(74) *Attorney, Agent, or Firm*—Godfried R. Akorli; Diderico van Eyl

(57) ABSTRACT

The present invention relates to a process for producing monodisperse anion-exchanger gels with high stability, purity and coarse particle size greater than 800 $\mu$m starting from a monodisperse bead polymer with a swelling index of from 2.5 to 7.5 and more than one subsequent feed procedure without any separation between the polymerization steps and then modifying to give the anion exchanger.

10 Claims, No Drawings

PROCESS FOR PRODUCING COARSE-PARTICLE ANION-EXCHANGER GELS

BACKGROUND OF THE INVENTION

1. Field of the Invention

The invention relates to a process for producing coarse-particle, monodisperse anionic-exchanger gels with high stability and purity.

2. Brief Description of the Prior Art

In recent times, increasing importance has been attached to anion exchangers whose particle size is as large and as uniform as possible, the particle size preferably being >800 μm, since the coarse grain size of the exchanger bed gives economic advantages in many applications. These advantages are provided in particular by monodisperse ion exchangers. They can be obtained by functionalizing monodisperse bead polymers articularly coarse-particle materials are suitable for use in gas adsorption, catalysis and hydrometallurgy. Processes usually used hitherto can produce ion exchangers with grain size from 300 to 800 μm. While the literature describes a number of methods for producing ion exchangers with particularly coarse grain size >800 μm, i.e. relatively coarse exchangers, these methods have associated disadvantages described below.

U.S. Pat. No. 2,992,544 describes the copolymerization of chloromethylstyrene and divinyl-benzene and the conversion to the anion exchanger. U.S. Pat. No. 3,122,514 describes the synthesis of coarse ion exchangers from polyvinyl compounds and prepolymers. However, both synthetic routes utilize starting materials which are not available in sufficient quantity and quality.

Another synthetic route gives ion exchangers composed of fine ion-exchanger grains with diameter mostly below 100 μm, or of broken ion-exchanger material, which are embedded within an inert material. Olefin polymers are often used as a means of embedding, as described in German Patent Specifications 1 285 170, 2 237 953 and 2 343 417, and also in DD Patent 114 350. A substantial disadvantage of these materials, however, is the low utilizable capacity resulting from the inert polymer content, and the difficulty of accessing the ion-exchanging particles.

Similarly DD Patent 158905 describes particles which are not always suitable for industrial applications, which are prepared by a feed procedure on inert polymer mouldings mainly based on olefin polymers, using styrene-divinylbenzene monomers, with subsequent modification to give ion-exchanging materials.

Another route to the production of coarse-particle ion exchangers consists in the seed-feed polymerization method. The underlying principle consists in preparing a seed from styrene and divinylbenzene with a low level of crosslinking. The crosslinker content here is to be from 0.05 to 0.6%. The use of the starting polymer with a very low level of crosslinking introduces more extractable constituents into the synthesis or results in more extractable constituents being leached out of the finished exchanger. Feed polymerization then takes place, using from 2 to 15 times the weight of the seed polymer, with is a great variation in the crosslinker content (from 0.5 to 50% by weight). EP-A 0 062 088 describes this principle, including conversion of the chloromethylated intermediate product to give the anion exchanger, under gentle conditions in the presence of dimethoxymethane.

DD Patent 229 696 improves the stability of the final product in the feed procedure by adding a means of inertization.

DD Patent 158 906 describes the synthesis of coarse-particle polymers as precursors for corresponding ion exchangers. Here again, a means of inertization is added to improve mechanical stability, and a specific stirrer is used to give coarse particles.

EP-A-0 098 130 and EP-A-0 101 943 describe the seed-feed process for preparing monodisperse bead polymers, which involves swelling a monodisperse polymer ("seed") in the monomer, which is then polymerized.

The seed polymers used in seed-feed processes should have a high swelling index so that during the seed-feed process they can absorb a large amount of the added monomers. The swelling index (SI) is defined as the quotient calculated from the volume of the swollen polymer and the volume of the non-swollen polymer. The swelling index can be controlled in a known manner via the content of crosslinker: low crosslinker contents lead to high swelling indices and vice versa. For example, styrene polymers crosslinked using from 0.8 to 2.0% by weight of divinyl-benzene have swelling indices of from 8 to 2.5 in toluene. However, seed polymers with a very low level of crosslinking have a very high fraction of uncrosslinked extractable constituents. This content of extractable constituents in the seed polymer is in many respects undesirable, because 1. polymer fractions dissolved out from the seed by the monomer added cause the particles to adhere to one another, and this can disrupt the polymerization of the swollen seed;
2. the concentration of the dissolved-out fraction increases in the reaction solutions used for the functionalization, and this can make the functionalization to prepare the anion exchangers more difficult;
3. the anion exchangers may comprise increased amounts of soluble polymers, and this can lead to undesired leaching from the ion exchangers.

Another problem with the known anion exchangers is that their mechanical and osmotic stability is not always adequate. This becomes particularly clear when exchangers with coarse grain sizes are synthesized. For example, the mechanical or osmotic forces which arise can fracture anion exchanger beads during their production or during their use. A rule applicable to all applications of anion ex-changers is that the exchangers must retain their bead form, and no degradation, partial or complete, or breakdown into fragments must occur during application. Fragments can pass into the solutions to be treated during application and contaminate these very solutions or render separation processes more difficult, and can lead to losses of adsorbed material. In addition, the presence of damaged anion exchangers is disadvantageous for the actual functioning of the ion exchangers used in column processes. Fragmented materials cause an increased pressure loss in the column system and thus reduce the throughput of the liquid to be purified through the column, or make separation more difficult in batch process applications.

The processes described above indicate clearly the problems associated with the synthesis of coarse-particle monodisperse ion exchangers which give rise to final products with coarse particle size and desirable physicochemical properties.

SUMMARY OF THE INVENTION

It is therefore an object of the present invention to develop a process for producing particularly coarse-particle, monodisperse anion-exchanger gels with grain size greater than 800 μm with high stability and purity, in order to prepare anion exchangers which are suitable not only for the typical applications of anion exchangers but are also very suitable for applications in hydrometallurgy. The monodisperse anion-exchanger gels to be synthesized according to the invention are moreover intended to have high stability and purity.

For the purposes of the present invention, purity means that the anion exchangers do not leach. Leaching becomes detectable in a rise of conductivity of water treated with the ion exchanger.

The object has now been achieved in that monodisperse anion-exchanger gels of appropriately coarse particle size can be obtained with high stability and purity by a seed-feed process using polymers with high swellability, with low content of soluble polymer fractions. This feed polymerization is carried out in two or more steps, for example in three or four steps.

The present invention provides a process for producing monodisperse anion-exchanger gels of a particularly coarse particle size (greater than 800 μm) with high stability and purity, characterized in that
  a.) a suspension of a seed polymer composed of a crosslinked polymer with a swelling index of from 2.5 to 7.5 (measured in toluene) and with less than 1% by weight of non-vapourizable, extractable fractions (measured by extraction using toluene) is formed in a continuous aqueous phase,
  b.) the suspended seed polymer is swollen in a monomer mixture made from vinyl monomer, crosslinker and free-radical initiator,
  c.) the monomer mixture is polymerized in the seed polymer,
  d.) the resultant polymer is again swollen in a monomer mixture made from vinyl monomer, crosslinker and free-radical initiator,
  e.) the second monomer mixture is polymerized in the first seed-feed polymer and
  f.) the resultant copolymer with swelling index from 1.5 to 3 and average diameter greater than 520 μm is functionalized by chloromethylation and then amination to give the anion exchanger.

In one particular embodiment of the present invention, a crosslinked polymer prepared from
  i) from 96.5 to 99.0% by weight of monomer,
  ii) from 0.8 to 2.5% by weight of crosslinker and
  iii) from 0.2 to 1.0% by weight of aliphatic peroxyester as polymerization initiator
is used as seed polymer in step a) of the process.

In a particular embodiment instantly claimed monodisperse anion-exchanger gels have a particle size from 800 to 1200 μm, preferably 800 to 1000 μm and especially preferred from 800 to 900 μm.

DETAILED DESCRIPTION OF THE INVENTION

Monomers (i) for preparing the seed polymer are compounds having, per molecule, one C=C-double bond capable of free-radical polymerization. Preferred compounds of this type encompass aromatic monomers, such as vinyl and vinylidene derivatives of benzene and of naphthalene, e.g. vinylnaphthalene, vinyltoluene, ethylstyrene, α-methylstyrene, chlorostyrenes, preferably styrene, and also non-aromatic vinyl and vinylidene compounds, e.g. acrylic acid, methacrylic acid, $C_1$–$C_8$-alkyl acrylate, $C_1$–$C_8$-alkyl methacrylate, acrylonitrile, methacrylonitrile, acrylamide, methacrylamide, vinyl chloride, vinylidene chloride and vinyl acetate. Preference is given to use of subordinate amounts of the non-aromatic monomers, these amounts preferably being from 0.1 to 50% by weight, in particular from 0.5 to 20% by weight, based on aromatic monomers. However, in most cases use will be made exclusively of aromatic monomers.

Compounds suitable as crosslinkers (ii) are those which contain, per molecule, two or more, preferably from two to four, double bonds capable of free-radical polymerization. Examples which may be mentioned are: divinylbenzene, divinyltoluene trivinylbenzene, divinylnaphthalene, trivinylnaphthalene, diethylene glycol divinyl ether, 1,7-octadiene, 1,5-hexadiene, ethylene glycol dimethacrylate, triethylene glycol dimethacrylate, trimethylolpropane trimethacrylate, allyl methacrylate, or methylene-N,N'-bisacrylamide. Divinylbenzene is preferred as crosslinker. For most applications, it is sufficient to use trade qualities of divinylbenzene which comprise ethylvinylbenzene alongside the isomers of divinylbenzene.

Aliphatic peroxyesters (iii) for preparing the seed polymers to be used according to the invention have the formulae (I), (II) or (III):

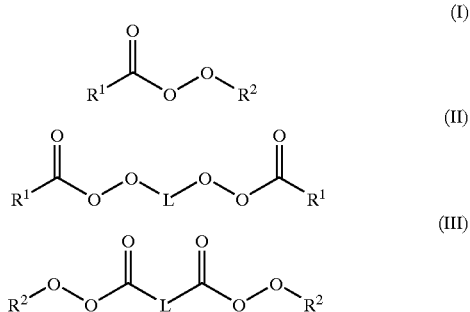

where
  $R^1$ is an alkyl radical having from 2 to 20 carbon atoms or a cycloalkyl radical having up to 20 carbon atoms,
  $R^2$ is a branched alkyl radical having from 4 to 12 carbon atoms and
  L is an alkylene radical having from 2 to 20 carbon atoms or a cycloalkylene radical having up to 20 carbon atoms.

Examples of preferred aliphatic peroxyesters of formula (I) are
tert-butyl peroxyacetate,
tert-butyl peroxyisobutyrate,
tert-butyl peroxypivalate,
tert-butyl peroxyoctoate,
tert-butyl peroxy-2-ethylhexanoate,
tert-butyl peroxyneodecanoate,
tert-amyl peroxyneodecanoate,
tert-amyl peroxypivalate,
tert-amyl peroxyoctoate,
tert-amyl peroxy-2-ethylhexanoate and
tert-amyl peroxyneodecanoate.

Examples of preferred aliphatic peroxyesters of formula (II) are
2,5-bis(2-ethylhexanoylperoxy)-2,5-dimethylhexane,
2,5-dipivaloylperoxy-2,5-dimethylhexane and
2,5-bis(2-neodecanoylperoxy)-2,5-dimethylhexane.

Examples of preferred aliphatic peroxyesters of formula (III) are
di-tert-butyl peroxyazelate and di-tert-amyl peroxyazelate.

However, it is also possible according to the invention to use aromatic diperoxides as free-radical initiators, an example being dibenzoyl peroxide.

In another particular embodiment of step a) of the process of the present invention, the seed polymer has been microencapsulated and is prepared by spraying. It is particularly advantageous here to microencapsulate the components monomer (i), crosslinker (ii) and aliphatic peroxyester as polymerization initiator (iii) for preparing the seed polymer, and to polymerize the microencapsulated particles to completion to give the seed polymer.

For the microencapsulation, use may be made of the materials known for this purpose, in particular polyesters, natural and synthetic polyamides, polyurethanes, polyureas. A particularly suitable natural polyamide is gelatine. This is used in particular in the form of coacervate or complex coacervate. For the purposes of the invention, gelatine-containing complex coacervates are especially combinations of gelatine and synthetic polyelectrolytes. Suitable synthetic polyelectrolytes are copolymers incorporating units such as maleic acid, acrylic acid, methacrylic acid, acrylamide or methacrylamide. Gelatine-containing capsules may be hardened by conventional hardeners, such as formaldehyde or glutaric dialdehyde. The encapsulation of monomer droplets, for example, with gelatine, with gelatine-containing coacervates and with gelatine-containing complex coacervates is described in detail in EP-A-0 046 535. The methods for encapsulation using synthetic polymers are known. An example of a highly suitable process is interphasial condensation, in which a reactive component dissolved in the monomer droplet (for example an isocyanate or an acid chloride) is reacted with a second reactive component (for example an amine) dissolved in the aqueous phase. According to the invention, preference is given to microencapsulation using gelatine-containing complex coazervate.

The polymerization of the microencapsulated droplets made from monomer (i), crosslinker (ii) and aliphatic peroxyester (iii) to give the seed polymer takes place in aqueous suspension, and it is advantageous here to use an inhibitor dissolved in the aqueous phase. Either inorganic or organic substances may be used as inhibitors. Examples of inorganic inhibitors are nitrogen compounds, such as hydroxylamine, hydrazine, sodium nitrite and potassium nitrite. Examples of organic inhibitors are phenolic compounds, such as hydroquinone, hydroquinone monomethyl ether, resorcinol, pyrocatechol, tert-butylpyrocatechol, condensation products of phenols with aldehydes. Other organic inhibitors are nitrogen-containing compounds, such as diethylhydroxylamine or isopropylhydroxylamine. According to the invention, resorcinol is preferred as inhibitor. The concentration of the inhibitor is from 5 to 1 000 ppm, preferably from 10 to 500 ppm, particularly preferably from 20 to 250 ppm, based on the aqueous phase.

After the polymerization, the seed polymer is isolated from the aqueous suspension and dried, preferably to a water content of less than 0.5% by weight.

The particle size of the seed polymer to be used according to the invention is from 5 to 500 $\mu$m, preferably from 20 to 400 $\mu$m, particularly preferably from 100 to 300 $\mu$m. The particle size distribution curve in each of the synthesis steps corresponds to that of the desired anion exchanger. To produce a narrowly-distributed or monodisperse ion exchanger, a narrowly distributed or monodisperse seed polymer has to be used.

In step a.) of the process, the dried seed polymer is suspended in an aqueous phase, and the ratio of seed polymer to water here may be from 1:5 to 1:20, preferably from 1:5 to 1:10. It is not necessary to use an auxiliary such as a surfactant or a protective colloid. Suspension may be achieved with the aid of a normal stirrer, for example, using low to moderate shear forces.

Step b) of the process adds, to the suspended seed polymer, a mixture made from monomer (a), crosslinker (aa) and free-radical initiator (aaa) ("feed 1"). As monomer (a), use may be made of the abovementioned monomers (i), namely styrene, vinyltoluene, ethylstyrene, alpha-methylstyrene, chlorostyrene, acrylic acid, methacrylic acid, acrylic esters, methacrylic esters, acrylonitrile, methacrylonitrile, acrylamide, methacrylamide, or else a mixture of these monomers. The use of styrene is preferred.

As crosslinker (aa), mention may be made of divinylbenzene, divinyltoluene, trivinylbenzene, divinylnaphthalene, trivinylnaphthalene, diethylene glycol divinyl ether, 1,7-octadiene, 1,5-hexadiene, ethylene glycol dimethacrylate, triethylene glycol dimethacrylate, trimethylolpropane trimethacrylate, allyl methacrylate, or methylene-N,N'-bisacrylamide. According to the invention, divinylbenzene is preferred. For most applications, it is sufficient to use trade qualities of divinylbenzene which comprise ethylvinylbenzene alongside the isomers of divinylbenzene.

The content of crosslinker in the monomer mixture of the feed is from 1 to 20% by weight, preferably from 0.5 to 5%.

Examples of free-radical initiators (aaa) suitable for the process of the invention are peroxy compounds, such as dibenzoyl peroxide, dilauroyl peroxide, bis(p-chlorobenzoyl) peroxide, dicyclohexyl peroxydicarbonate, tert-butyl peroctoate, 2,5-bis(2-ethylhexanoylperoxy)-2,5-dimethylhexane and tert-amylper-oxy-2-ethylhexane, and also azo compounds, such as 2,2'-azobis(isobutyronitrile) and 2,2'-azobis(2-methylisobutyronitrile), and the aliphatic peroxy esters described above. The amounts generally used of the free-radical initiators are from 0.05 to 2.5% by weight, preferably from 0.2 to 1.5% by weight, based on the mixtures made from monomer (a) and crosslinker (aa).

The ratio of seed polymer to added mixture (seed-feed ratio) is generally from 1:0.5 to 1:20, preferably from 1:0.75 to 1:10; particularly preferably from 1:1 to 1:5. The added mixture enters the seed polymer during swelling. The maximum amount of feed which is entirely absorbed by the seed is greatly dependent on the crosslinker content of the seed. For a given particle size of the seed polymer, the particle size of the resultant copolymer can be adjusted via the seed-feed ratio.

The polymerization of the swollen seed polymer in step c) of the process to produce the copolymer may take place in the presence of one or more protective colloids and, where appropriate, of a buffer system. Suitable protective colloids are natural and synthetic water-soluble polymers, for example gelatine, such as type A gelatine, starch, polyvinyl alcohol, polyvinylpyrrolidone, polyacrylic acid, polymethacrylic acid or copolymers made from (meth)acrylic acid or (meth)acrylic esters. Cellulose derivatives are particularly suitable, in particular cellulose esters or cellulose ethers, such as carboxymethylcellulose, hydroxyethylcellulose or methylhydroxyethylcellulose. Cellulose derivatives are preferred as protective colloids. The amount used of the protective colloids is generally from 0.05 to 1% by weight, based on the aqueous phase, preferably from 0.1 to 0.5% by weight. Carboxymethylcelluloses with a reversible precipitation temperature are particularly suitable.

The polymerization may be carried out in the presence of a buffer system. Preference is given to buffer systems which set the pH of the aqueous phase at the start of the polymerization to a value from 14 to 6, preferably from 13 to 8. Under these conditions, protective colloids having carboxylic acid groups are present entirely or to some extent in the form of salts. This has an advantageous effect on the action of the protective colloids. According to the invention, buffer systems which are particularly suitable comprise phosphate salts or borate salts.

The ratio of organic phase to aqueous phase in the polymerization of the swollen seed in step c) of the process is from 1:5 to 1:20, preferably from 1:5 to 1:10.

The temperature during the polymerization of the swollen seed polymer depends on the decomposition temperature of the initiator (aaa) used. It is generally from 50 to 100° C., preferably from 55 to 90° C. The polymerization takes from 1 hour or more. Process control by means of a temperature program in which the polymerization is started at low temperature, for example 63° C., and the reaction temperature is raised as polymerization conversion increases has proven successful. In this way the process can be carried out with low risk and with high polymerization conversion.

After the polymerization, the copolymer may be isolated by conventional methods, for example by filtration or decanting, and dried where appropriate after one or more washes and, if desired, screened and put to further use.

However, in the process of the invention, the copolymer can remain in the aqueous phase and, without any solid-liquid phase separation, is again subjected to feed polymerization in steps d) and e) of the process.

In step d) of the process, a mixture of monomer (a), crosslinker (aa) and free-radical initiator (aaa) ("feed 2") is again added to the polymer suspension. The substances which can be used are the same as those described for the first feed step.

The ratio of first feed polymer to mixture used is generally from 1:0.5 to 1:10, particularly preferably from 1:1 to 1:5. The crosslinker content in the second monomer mixture is from 1 to 10% by weight. The maximum amount of feed that is absorbed by the first feed polymer depends on its overall level of crosslinking. Surprisingly, it has been found here that for a given particle size of the feed polymer the particle size of the target copolymer can be adjusted via the seed-feed ratio. It was also surprising that the desired grain size of the final product can then in turn be achieved by way of controlled adjustment of the chlorine value in the chloromethylate intermediate product and full amination.

It is therefore advantageous for the polymerization of the swollen feed polymer to take place in the same aqueous phase: that in which the first feed polymerization takes place. After an initial swelling phase, which has to be adapted to the circumstances, it is again possible to add a protective colloid. Here again, use may be made of the above-mentioned protective colloids.

The polymerization temperature in step e) of the process depends on the decomposition temperature of the initiator used. It is preferably from 55 to 90° C. The polymerization takes a number of hours. Here, too, it has proven successful to run the polymerization under process control, i.e. to use a program beginning at relatively low temperatures and ending at relatively high temperatures, as appropriate for the polymerization conversions.

According to the invention, the feed addition step may be repeated two or more times. However, it is also possible for the process of the invention to be terminated after the second feed polymerization and for the polymer to be worked up by decanting, washing, filtering, drying and, where appropriate, screening. In this case, the polymers of feed steps 1 and 2 have swelling indices of from 2.5 to 3.5 and from 1.75 to 2.5 and grain size ranges of from 380 to 420 μm and 560 to 600 μm.

The conversion of the copolymers to the anionic exchanger in step f) of the process takes place by chloromethylation and subsequent amination. For the chloromethylation, it is preferable to use chloromethyl methyl ether. It is possible to use an industrial quality of chloromethyl methyl ether, and this may comprise methylal or formaldehyde, for example, as ancillary components. The chloromethyl methyl ether is used in excess and according to the invention acts not only as reactant but also as suspension medium and swelling agent. It is therefore not generally necessary to use any other suspension medium. According to the invention, it is preferable for the degree of chloromethylation targeted to be from 80 to 90%.

According to the invention, the chloromethylation reaction is catalysed by adding a Lewis acid. Examples of suitable catalysts are ferric chloride, zinc chloride, stannic chloride and aluminium chloride, preference being given to ferric chloride in the form of an aqueous solution of from 35 to 45% strength. The reaction temperature may be in the range from 40 to 80° C. If the procedure is carried out at atmospheric pressure, a particularly advantageous temperature range is from 50 to 60° C., with preference from 50 to 55° C. The volatile constituents, such as hydrochloric acid, methylal, formaldehyde and to some extent chloromethyl methyl ether, may be removed by stripping during the reaction. To remove the chloromethyl methyl ether which has entered the material during swelling, and also to purify the chloromethylate, once the reaction solution has been separated off washing may be undertaken, using methylal, methanol, and finally water.

To produce the anion exchangers according to the invention, the chloromethylated copolymer with swelling index from 1.5 to 3 and with an average diameter greater than 520 μm is reacted with amines. According to the invention, it is possible to produce coarse-particle monodisperse weakly basic anion exchangers and coarse-particle monodisperse, strongly basic anionic exchangers with grain size greater than 800 μm.

To produce weakly basic anion exchangers, the chloromethylated copolymer is reacted with ammonia, with a primary amine, such as methylamine or ethylamine, or with a secondary amine, such as dimethylamine.

Reaction with tertiary amines gives strongly basic anion exchangers. Suitable tertiary amines are trimethylamine, dimethylaminoethanol, triethylamine, tripropylamine and tributylamine. It is also possible to use polyamines, such as ethylenediamine or dimethylaminopropylamine.

For complete reaction of the chloromethylated copolymer it is necessary to use at least 1 mol of amine based on 1 mol of chlorine in the chloromethylate. Preference is given to a slight excess of amine. From 1.1 to 1.3 mol of amine per mole of chlorine are particularly preferred.

The amination reaction may advantageously take place in the presence of water. The water here has various tasks. It is simultaneously suspension medium, solvent for the amine and swelling agent for the resultant anion exchanger. During the amination, the resin continuously absorbs water and swells in the process. This means that a minimum amount of water is needed if the mixture is to remain stirrable. There is no particular upper limit to the amount of water to be used according to the invention. However, very large amounts of water are disadvantageous, since the space-time yield is lowered as a consequence of amine dilution. At least 1.5 grams, preferably from 2 to 4 grams, of water are to be used per gram of chloromethylated copolymer.

The reaction mixture may comprise subordinate amounts of solvent, such as methanol or methylal. A chloromethylated copolymer moistened with methanol may therefore be used without difficulty. However, it is preferable not to add any organic solvent. In one particular embodiment, swelling solvents may also be utilized with the chloromethylate.

In one preferred embodiment of the present invention, the amination is carried out in the presence of an inorganic salt dissolved in the water. Suitable salts are water-soluble halides, carbonates or sulphates of alkali metals, such as sodium or potassium, and of alkaline earth metals, such as magnesium or calcium. Sodium chloride is preferably used.

The amount of the inorganic salt used is less than 5 percent by weight, based on the total amount of water. It is preferable to use from 1 to 4.5% by weight, particularly from 1.5 to 4% by weight, of inorganic salt, based on the total amount of water. The total amount of water is calculated from the total added water and the amount of water introduced within the aqueous amine solution, if aqueous amine solution is used.

The temperature at which the amination is carried out may be in the range from room temperature to 160° C. It is preferable to use temperatures of from 40 to 120° C., particularly preferably in the range from 50 to 90° C.

After the amination, the resultant anion exchanger is washed and then treated in dilute hydrochloric acid (from 1 to 10% strength) at temperatures of from 20 to 120° C., preferably from 50 to 90° C. In one embodiment, the product is isolated by settlement or filtration and washed with water for further purification.

The present invention also provides weakly basic, mixed basic or strongly basic, monodisperse anion-exchanger gels with a grain size of more than 800 $\mu$m, obtainable by:

a) a suspension of a seed polymer composed of a crosslinked polymer with a swelling index of from 2.5 to 7.5 (measured in toluene) and with less than 1% by weight of non-vapourizable fractions (measured by extraction using toluene) is formed, preferably in a continuous aqueous phase, b) the suspended seed polymer is swollen in a monomer mixture made from vinyl monomer, crosslinker and free-radical initiator, c) the monomer mixture is polymerized in the seed polymer, d) the resultant polymer is again swollen in a monomer mixture made from vinyl monomer, crosslinker and free-radical initiator, e) the second monomer mixture is polymerized in the first seed-feed polymer and f) the resultant copolymer with swelling index from 1.5 to 3 and average diameter greater than 520 $\mu$m is functionalized by chloromethylation and then amination.

The anion exchangers of the invention may, where appropriate, be converted in a known manner into other forms by exchanging the chloride ion for another counterion. Despite their coarse grain size of more than 800 $\mu$m, the monodisperse anion-exchanger gels obtained by the process of the invention have particularly high stability and purity.

Main application sectors for these anion exchangers are the extraction and reclamation of anionic heavy metal complexes, use in hydrometallurgical processes, such as uranium production, the reclamation of precious metals via irreversible adsorption of their chloro, sulphato or cyanide complexes, treatment of pickling baths; for example removal of iron from hydrochloric acid. Even after prolonged use and repeated regeneration no defects are apparent on the ion-exchanger beads, nor is any leaching from the exchanger.

Without being bound to any particular theory of the invention, it has been found that analysis of the products showed that the repeated feed procedure results in intertwining effects in the polymer which are stable and therefore result in an improvement in mechanical and osmotic stability of the coarse-particle anion exchangers, while at the same time requiring less crosslinker component in the production process.

The monodisperse anion-exchanger gels according to the present invention are suitable for use in gas adsorption, catalysis and hydrometallurgy. Because of their stability in a chatillon-test (having stabilities between 1200 and 700) they can preferably be used for uranium adsorption from resins pulps.

The invention is further illustrated but is not intended to be limited by the following examples in which all parts and percentages are by weight unless otherwise specified.

EXAMPLES

Test Methods:
Non-Vapourizable Extractable Fractions in Seed Polymer

For determination of non-vapourizable and extractable fractions, from 5 to 7 g of seed polymer were weighed into an extraction thimble and extracted overnight in a Soxhlet apparatus using 800 ml of toluene (bath temperature: 140° C.). The extract was filtered via a suction filter using a black-ribbon filter, and concentrated to about 1 ml on a rotary evaporator. 300 ml of methanol were then added and the product was dried to constant weight in vacuo on the rotary evaporator. Two determinations were carried out from each specimen.

Swelling of Seed Polymer

The swelling of the seed polymers was studied in toluene. For this, 10 ml of dried, screened bead polymer were weighed into a 100 ml measuring cylinder. The quotient calculated from the volume of the bed ($V_0$) and the weighed-in amount (m) gave the bulk volume ($V_{sch}$). The measuring cylinder was filled to 100 ml with the swelling agent and allowed to stand for from 10 to 20 h. During this period it was shaken fairly frequently and provision was made for escape of any air bubbles arising. The volume of the swollen bed was read off and gave $V_1$. The quotient calculated from $V_1$ and $V_0$ is defined as the volume swelling index ($SI_{v/v}$).

Number of Perfect Beads after Production 100 beads were inspected under the microscope. The number of beads bearing cracks or exhibiting splintering was determined. The number of perfect beads is calculated from the difference between 100 and the number of damaged beads.

Example 1 a.) Preparation of a Seed Polymer 1960 ml of deionized water are placed in a 4 l glass reactor, and to this are added 630 g of a microencapsulated mixture made from 1.0% by weight of divinylbenzene, 0.2% by weight of ethylstyrene (used in the form of a commercially available mixture of divinylbenzene and ethylstyrene with 80% by weight of divinylbenzene), 0.5% by weight of tert-butyl 2-ethylperoxyhexanoate and 98.8% by weight of styrene, the microcapsules being composed of a formaldehyde-hardened complex coacervate made from gelatine and from an acrylamide-acrylic acid copolymer. The average particle size is 300 $\mu$m. The mixture is mixed with a solution made from 2.4 g of gelatine, 4 g of sodium hydrogenphosphate dodecahydrate and 100 mg of resorcinol in 80 ml of deionized water, and slowly stirred and polymerized, with stirring, for 10 h at 75° C. The polymerization is then completed by increasing the temperature to 95° C. The mixture is washed by way of a 32 μm screen and dried. This gives 605 g of a bead-shaped microencapsulated polymer with a smooth surface. The polymer beads are visually transparent. The volume swelling of the seed polymer is 700 ml/100 g of polymer and its average diameter is 290 μm.

b.) Preparation of a Copolymer

1st Feed Procedure 200 g of seed polymer from (a) and an aqueous solution made from 1760 g of deionized water, 5.75 g of boric acid and 1.59 g of sodium hydroxide are charged to a 4 l glass reactor and the stirrer speed is set to 220 rpm (revolutions per minute). Within 45 min, a mixture made from 395 g of styrene, 50 g of divinylbenzene (80.0% purity by weight) and 4 g of dibenzoyl peroxide (75% purity by weight, moistened with water) is added as feed. The mixture is stirred for 180 min at room temperature, with nitrogen-flushing of the gas space for 15 min. 195 g of a 2% strength aqueous solution of methylhydroxyethylcellulose in deionized water are then added. The mixture is heated to 63° C. within a period of 90 min and held for 10 hours at this temperature, and it is then heated to 95° C. within a period of 90 min and held at that temperature for 2 hours. The mixture remains in the reaction vessel after cooling. The volume swelling of the polymer is 510 ml/100 g of polymer, and its average diameter is 410 μm.

2nd Feed Procedure

The mixture still present in the polymerization apparatus is subjected to a second feed step. For this, an oil phase composed of 1128.2 g of styrene, 71.8 g of divinylbenzene (80% purity) and 10 g of dibenzoyl peroxide were metered into the stirred suspension over a period of 45 minutes. The mixture is stirred for 6 hours at room temperature, and then 195.2 g of a 2% strength aqueous solution of methylhydroxyethylcellulose are added, and the mixture is heated to 63° C. in 90 minutes and held at this temperature for 10 hours. It is then heated to 95° C. in 60 minutes and hardened at 95° C. for 2 hours. After 3 hours of cooling the mixture is subjected to four decanting procedures using demineralized water, removal of volatiles by suction, and drying at 70° C. for 4 hours.

Yield: 1696 g Swelling: 340 ml/100 g of polymer Average diameter: 580 μm c.) Chloromethylation of Copolymer 140 ml of a mixture made from monochlorodimethyl ether, methylal and ferric chloride (14.8 g/l) is charged to a 250 ml sulphation flask, and 30 g of copolymer from b.) 2nd feed procedure are then added. The mixture is heated to 50° C. in 3 h. Stirring is then continued for a further 6 h under reflux in the range from 50 to 55° C. During the reaction time hydrochloric acid and low-boiling organics are driven off. The reaction suspension is then washed thoroughly with 150 ml of methanol, and then with methylal, and then 3× with methanol and with deionized water. This gives 74 ml of moist chloromethylated bead polymer. Chlorine content: 18.7% d.) Production of a Strongly Basic Type I Anion Exchanger 600 ml of deionized water are charged to the autoclave. 15 g of sodium chloride are dissolved therein. To this are added 70 ml of chloromethylated bead polymer, moist from suction filtration, and 100 g of 45% strength by weight aqueous trimethylamine solution. The suspension is heated to 70° C. in 1.5 h and stirred for a further 2 hours at 70° C., heated to 80° C. in 1 hour and stirred for a further 2 hours at 80° C. After cooling to room temperature, the mother liquor is removed under suction and the resin is treated with 800 ml of demineralized water and stirred for 30 min at room temperature. The water is separated off and replaced by 1 000 ml of 3% strength by weight aqueous hydrochloric acid. The suspension is stirred at 70° C. for 4 h. After cooling, the liquid is separated off and the resin is taken up in water and washed with demineralized water until neutral.

| Yield: 167 ml of Cl-form anion exchanger | |
|---|---|
| Exchange capacity: | 1.28 eq/l |
| Number of perfect beads after production: | 95/100 |
| Average diameter: | 879 μm |
| Average diameter ± 50 μm: | 86.5% |
| Beads > 800 μm: | 97.5% |

Example 2 (Inventive)

Production of a Strongly Basic Type II Anion Exchanger 1500 ml of deionized water are charged to a 4-necked flask. 70 g of sodium chloride are dissolved therein. To this are added 800 ml of moist chloromethylated bead polymer prepared by a method based on Example 1 with a chlorine content of 19.51% by weight and 312 g of dimethylaminoethanol. The suspension is heated to 90° C. in 2 h and stirred for a further 2 hours at 90° C. and 6 hours at 95° C. After cooling to room temperature, the mother liquor is removed under suction, and the resin is then washed with 1 600 ml of demineralized water. The product is then stirred in 1600 ml of 3% strength by weight aqueous hydrochloric acid at 70° C. for 4 h. After cooling, the liquid is separated off, and the resin is taken up in water and eluted in a column from below using 6 bed volumes of deionized water.

| Yield: 1710 ml of resin, tamped | |
|---|---|
| Exchange capacity: | 1.32 eq/l |
| Number of perfect beads after production: | 98/100 |
| Average diameter: | 888 μm |
| Average diameter ± 50 μm: | 83.4% |
| Beads > 800 μm: | 96.8% |

Although the invention has been described in detail in the foregoing for the purpose of illustration; it is to be understood that such detail is solely for that purpose and that variations can be made therein by those skilled in the art without departing from the spirit and scope of the invention except as it may be limited by the claims.

What is claimed is:

1. Process for producing monodisperse anion-exchanger gels with high stability and purity and grain size greater than 800 μm, comprising:
   a.) forming a suspension of a seed polymer composed of a crosslinked polymer with a swelling index of from 2.5 to 7.5 and with less than 1% by weight of non-vapourizable, extractable fractions in a continuous aqueous phase,
   b.) swelling the suspended seed polymer in a monomer mixture made from vinyl monomer, crosslinker and free-radical initiator,
   c.) polymerizing the monomer mixture in the seed polymer,
   d.) swelling the resultant polymer in a second monomer mixture made from vinyl monomer, crosslinker and free-radical initiator,
   e.) polymerizing the second monomer mixture in the first seed-feed polymer and f.) functionalizing the resultant copolymer with swelling index from 1.5 to 3 and average diameter greater than 520 μm by chloromethylation and then amination to give the anion exchanger.

2. Process according to claim 1, wherein the seed polymer is a crosslinked polymer prepared from
   i) from 96.5 to 99.0% by weight of monomer
   ii) from 0.8 to 2.5% by weight of crosslinker and
   iii) from 0.2 to 1.0% by weight of aliphatic peroxyester as polymerization initiator.

3. Process according to claim 2, wherein the aliphatic peroxyester has the formulae (I), (II) or (III),

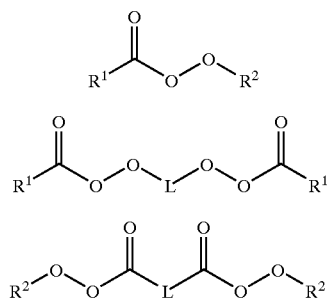

where
R$^1$ is an alkyl radical having from 2 to 20 carbon atoms or a cycloalkyl radical having up to 20 carbon atoms,
R$^2$ is a branched alkyl radical having from 4 to 12 carbon atoms and
L is an alkylene radical having from 2 to 20 carbon atoms or a cycloalkylene radical having up to 20 carbon atoms.

4. Process according to claim 2, wherein the seed polymer is prepared by spraying and microencapsulation, and is monodisperse and has a swelling index of from 2.5 to 7.5.

5. Process according to claim 1, wherein the feed polymerization is carried out in at least two or more steps.

6. Process according to claim 5, wherein the feed polymerizations take place in succession without any solid-liquid phase separation.

7. Process according to claim 5, wherein the free-radical initiator for the feed polymerization is an aliphatic peroxyester or an aromatic diperoxide.

8. Process according to claim 5, wherein the feed steps comprise use of a protective colloid which is a reversible methylhydroxyethylcellulose or type A gelatine.

9. Process according to claim 5, wherein the feed steps 1 and 2 provide swelling indices of from 2.5 to 3.5 and from 1.75 to 2.5 and grain size ranges of from 380 to 420 μm and 560 to 600 μm.

10. Process according to claim 1, wherein chloromethylation is from 80 to 90% and the amination takes place in the presence of less than 5% by weight, based on the total amount of water, of an inorganic salt.

* * * * *